United States Patent [19]

Meier, Jr.

[11] 4,234,276
[45] Nov. 18, 1980

[54] DRESSER FOR OFFSET ELECTRODE

[75] Inventor: George D. Meier, Jr., Wyoming, Mich.

[73] Assignee: Electrode Dressers Incorporated, Mich.

[21] Appl. No.: 25,895

[22] Filed: Apr. 2, 1979

[51] Int. Cl.³ .................. B23B 39/00; B23B 41/00; B23B 51/00
[52] U.S. Cl. ..................... 408/104; 269/287; 279/6; 408/83.5; 408/203.5
[58] Field of Search ............... 408/72, 84, 87, 90, 408/97, 98, 99, 104, 110, 114, 115, 83.5, 203.5; 269/287, 288; 279/6; 51/237 M

[56] References Cited

U.S. PATENT DOCUMENTS

| | | | |
|---|---|---|---|
| 1,355,248 | 10/1920 | Nonneman | 408/104 |
| 1,721,648 | 7/1929 | Swartz | 408/97 |
| 1,927,463 | 9/1933 | McIntosh | 408/83.5 |
| 2,254,281 | 9/1941 | Grey | 408/90 |
| 2,456,776 | 12/1948 | Faust | 279/6 |
| 3,278,957 | 10/1966 | Curran | 269/288 |
| 3,992,123 | 11/1976 | Uyetake et al. | 408/104 |

*Primary Examiner*—Harrison L. Hinson
*Attorney, Agent, or Firm*—Price, Heneveld, Huizenga & Cooper

[57] ABSTRACT

An offset electrode dresser includes a cylindrical collar having an aperture offset from its axis for retaining an electrode to expose only that area of an electrode tip which is to be dressed. A dressing tool is contained within a chuck which is positioned over the cylindrical collar to align the electrode tip with the dressing tool engaging the electrode in a position offset from the axis of the electrode. The chuck can be rotated by a pneumatic tool at a rate of speed for dressing the offset electrode tip.

17 Claims, 3 Drawing Figures

DRESSER FOR OFFSET ELECTRODE

BACKGROUND OF THE INVENTION

The present invention relates to electrode dressers and more particularly to dressers for offset electrode tips.

There exists in the prior art three basic methods for dressing electrode tips. The first method for dressing electrode tips involves hand filing which, although by far the most popular method, it is also the most time consuming and is inaccurate because of the inability to manually dress the electrodes to retain their precise original shape. Misfiling and/or excessive removal of material is commonplace with the result being that the full life span of an electrode is shortened. Offset tip electrodes are in demand in industry because they can be used to weld places where ordinary symmetrical electrodes cannot reach. Hand filing of electrodes with offset tips provides unique problems because the area surrounding the tip is not filed in a symmetric manner.

The second manner of dressing electrodes involves placing a dressing blade against an electrode tip by use of a hand ratchet, and rotating the hand ratchet until the electrode tip is dressed in the required manner. As with hand filing, hand ratcheting lacks accuracy and is very time consuming.

The third method involves the use of automatic cutters. Automatic cutters are certainly the quickest, easiest, most accurate method of dressing electrode tips.

In addition, it is not necessary in most cases to remove the tip from the loading machine when dressing an electrode tip with an automatic cutter. Although automatic cutters have decided advantages over hand filing and hand ratcheting, they have, up to the present, only been useful in dressing electrode tips that have a configuration which is symmetric about the center of the electrode.

Thus, there is a need for an electrode tip dresser which can dress electrodes with offset tips in the environment of automatic cutters. Because offset electrode tips are difficult to dress using hand filing or hand ratcheting techniques, the need for an offset electrode tip dresser in the environment of the automatic cutter is more pronounced.

SUMMARY OF THE INVENTION

The dresser for offset tip electrodes which is the subject of the present invention satisfies this need by providing an offset tip collar for retaining an electrode in such a manner as to expose only that area of the electrode tip which is to be dressed by a dressing tool, thus producing an electrode with an offset tip.

In accordance with the present invention, the offset tip collar comprises a cylindrical member having an electrode receiving aperture offset from the axis of the cylindrical collar. The offset tip collar also includes means for securing the electrode therein such that when used with a rotatable chuck holding a dressing tool, the exposed electrode is dressed in an offset manner.

Preferably, the offset tip collar is dimensioned so that it can be placed over the electrode while the electrode is in place on a welding machine, although the offset tip collar can also be used when an electrode has been removed from the welding machine.

These and other features, objects, and advantages of the present invention can best be understood by reference to the following description thereof, together with the drawings in which:

DETAILED DESCRIPTION OF THE PREFERRED EMBODIMENT

Figure 1:
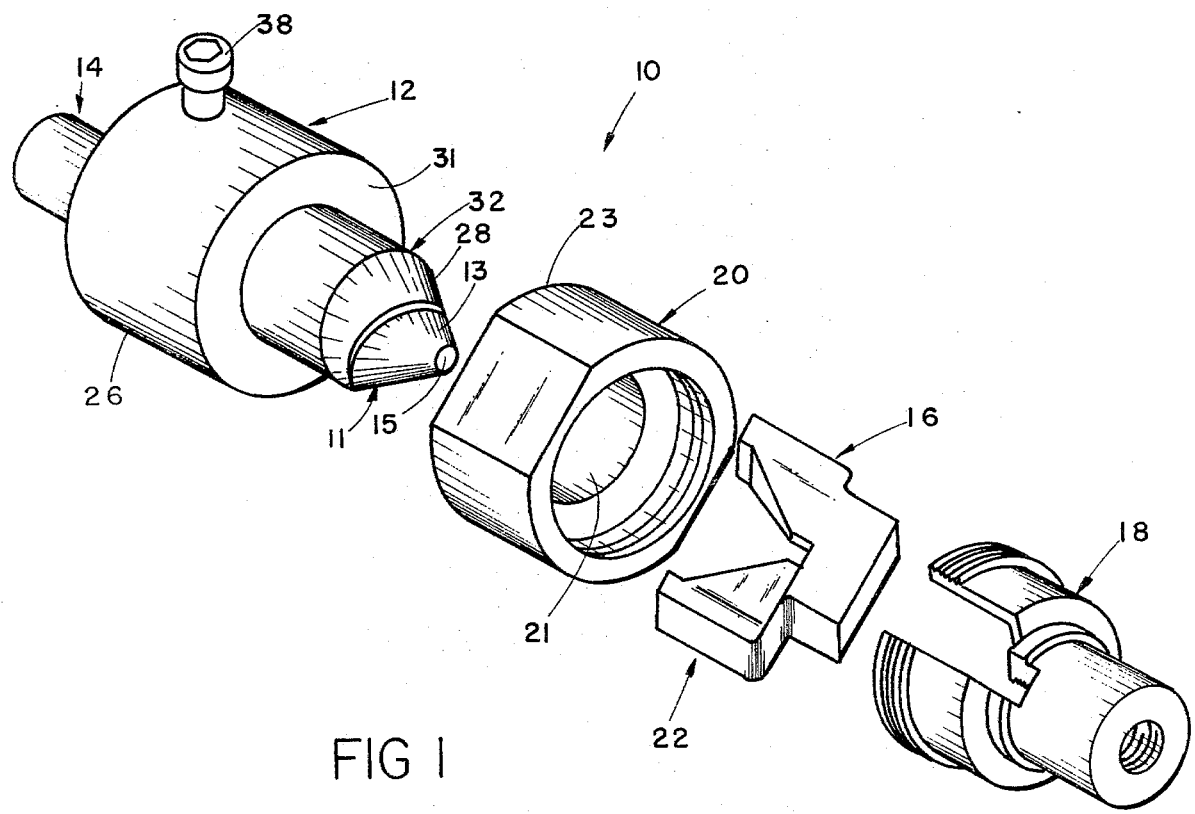
FIG. 1 is an exploded perspective view of the dresser for an offset electrode of the present invention.
Figure 3:
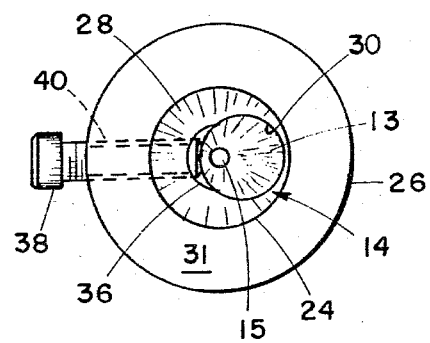
FIG. 3 is a top plan view of the offset tip collar and electrode shown in FIG. 2.
Figure 2:
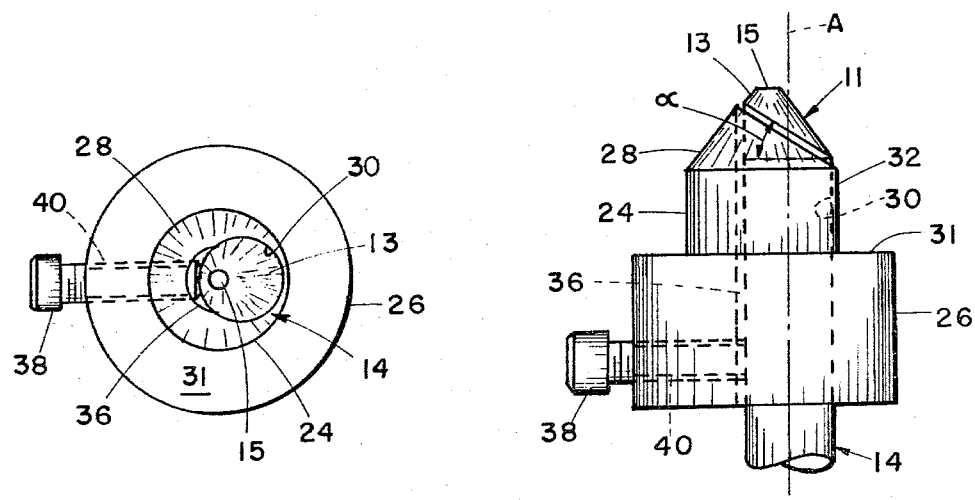
FIG. 2 is a side elevational view in reduced scale of the offset tip collar with an electrode in place.

Referring now to the drawings, and particularly to FIG. 1, there is shown a dresser assembly 10 for an offset electrode 14 with the components of the dresser shown in an exploded perspective view. Electrode 14 is a solid rod of copper, a compound of copper and aluminum, or other materials and is the type used in spot welding equipment employed, for example, in the automotive industry. Rod 14 has an offset tip 11, as best seen in FIGS. 2 and 3, defined by a truncated cone 13 which is offset from the axis A (FIG. 2) of the rod. The tip end of the rod includes a flat disc-shaped contact 15 which is the electrical contact with a workpiece. The tip 11, including contact 15, is worn during use and must be dressed (i.e., returned to its original shape) periodically. In the embodiment shown, rod 14 has a diameter of about 0.6 inches and the conical-shaped tip 13 is formed by a cone offset from the axis of rod 14 by about 0.15 inches such that it is asymmetric and forms, as seen in FIG. 2, an angle $\alpha$ of about 40° where it intersects with the cylindrical wall of the rod.

Electrode 14, which is to be dressed in an offset tip manner (i.e., the tip is not centered on the electrode) is longitudinally held in an offset tip collar 12, exposing only that portion of the electrode which is to be dressed. A dressing tool such as a blade 16 is positioned within a chuck 18, and the chuck 18 is then threaded into the retaining nut 20 for securing tool 16 within the chuck. The retaining nut-chuck and blade assembly 22 is commercially available and can then be slidably positioned over an upper cylindrical guide member 32 of the offset tip collar 12. Chuck 18 is adapted to fit within a rotary tool 19 (FIG. 1) such as a drill press, lathe, drill, or pneumatic rotary tool which are commercially available. The rotary tool then is used to dress the tips while in place in the machine using the collar 12 as a guide. Having briefly described the system, a detailed description of the novel collar is now presented.

Collar 12 includes a cylindrical base 26 with an upper cylindrical guide member 32 integrally connected to the cylindrical base and upper member 32 consisting of a lower cylindrical portion 24 having a diameter of which is smaller than the cylindrical base 26 and an upper conical portion 28. The outer diameter of guide 32 is slightly less than the inner diameter of cylindrical surface 21 (FIG. 1) of retainer nut 20. Surface 21 is sufficiently elongated such that when the dresser assembly is filled over the collar 12, the annular face 23 of nut 20 contacts the annular surface 31 of collar 12 during dressing when electrode 14 is being machined to provide longitudinal as well as axial alignment between assembly 22 and collar 12 with respect to the electrode 14.

A vertically extending aperture 30 extends from the bottom of the cylindrical base 26 through the top of the conical portion 28 of the guide 32, thus truncating the conical portion 28 of the guide. The vertically extending aperture 30 has a diameter greater than the outer diameter of the electrode 14 and is offset from the longitudinal axis of the cylindrical base 26 and the conical portion 28 of the guide 32. In the preferred embodiment of the invention, for use with an electrode 14 having a diameter of about 0.6 inches, aperture 30 had a diameter of about 0.65 inches and was offset from the axis of collar 12 by about 0.4 inches. As seen in FIG. 3, the edge of aperture 30 has a semicircular relief 36 extending longitudinally along the left edge (as seen in FIG. 3) of aperture 30 through its length. Relief 36 is formed with a machine tool having a diameter of about 0.5 inches in the preferred embodiment. Communicating with relief 36 in base 26 is a threaded aperture 40 extending transversely to the axis of collar 12 for receiving a set screw 38 used for clamping electrode 14 in position against the wall of aperture 30 remote from relief 36, as best seen in FIGS. 2 and 3. When an electrode has been worn, the tip 15 becomes mushroomed. The purpose of the relief aperture 36 is to allow such an electrode sufficient room to be passed through the offset tip collar 12 into the proper dressing position within the offset tip collar 12.

The offset tip collar 12 is manufactured by beginning with an appropriate length of cylindrically-shaped cold-rolled steel and machining this piece down to the shape of the offset tip collar 12 as shown in the drawings. The vertically extending aperture 30 is constructed by machine boring the first and second circular apertures 30 and 36, respectively, and the horizontally extending aperture 40 is made by machine boring and then tapping it. The offset tip collar 12 is then case hardened to a depth of 0.008 inches plus or minus 0.003 inches by conventional heat treating techniques. The chuck 18, dressing tool 16, and retaining nut 20 are items which are commercially available from existing manufacturers.

In operation, the electrode 14 may either be dressed while it is in place on a welding machine or it may be removed from the welding machine and then dressed The following description of the operation of the dresser for an offset electrode 10 will assume that the electrode 14 is being dressed while it is on the machine.

The electrode 14 must first be properly positioned within the offset tip collar 12, which is accomplished by sliding the offset tip collar 12 over the electrode 14. The electrode 14 is then aligned within the offset tip collar 12 by positioning the tip 40 in the offset tip collar 12 so as to be in transverse alignment (see FIG. 2) with the set screw 38 and closest to that wall of the circular aperture 30 which is in connection with the threaded aperture 40. The electrode 14 is vertically positioned by exposing only the end which needs to be dressed. The retaining nut-chuck assembly 22, having been previously attached to a pneumatic drill or other similar device, is then slidably mounted over the guide member 32 of the offset tip collar 12, thus bringing the dressing blade 16 into contact with the electrode 14. Activation of the pneumatic drill or similar device causes the retaining nut-chuck assembly 22 to rotate at a speed of from 1000–2000 rpm, thus rotating the dressing blade 16 at a high speed, and cutting or abrading the electrode 14 in an offset manner resulting in a dressed tip as shown in FIG. 1. A steel blade 16 can be used or other dressing tools such as abrading tools of different compositions could likewise be employed in assembly 22.

It will be apparent to those skilled in the art that various modifications to the preferred embodiment of the invention can be made without departing from the spirit and scope of the present invention as defined by the appended claims.

I claim:

1. An offset tip collar for retaining a rod-shaped member in a manner as to expose an area of the member tip which is to be dressed by a dressing tool for producing a member with an offset tip, said offset tip collar comprising:
    a base including guide means for guidably receiving a dressing tool, said base including a longitudinally extending aperture extending through said base and radially offset from the longitudinal axis of said base; and
    means for securing a rod-shaped member in said base and within said aperture.

2. The apparatus as defined in claim 1 wherein said base is cylindrical and said guide means comprises a cylindrical extension of said base having a diameter smaller than said base and wherein said aperture extends through said cylindrical extension.

3. The apparatus as defined in claim 2 wherein the junction of said cylindrical base and said extension define a transversely extending annular surface for engaging a chuck into which a dressing tool is mounted to provide longitudinal alignment between the dressing tool and a member held in said base.

4. The apparatus as defined in claim 3 wherein the end of said cylindrical extension remote from said base is a truncated cone.

5. The apparatus as defined in claim 1 wherein said collar includes a longitudinally extending relief formed along one side of said aperture.

6. The apparatus as defined in claim 5 wherein said means for securing a rod-shaped member in said collar comprises a threaded aperture formed transversely through said base and communicating with said relief and set screw means threadably extending into said threaded aperture.

7. A collar for supporting an electrode in such a manner as to expose only that area of the electrode tip which is to be dressed by a dressing tool for producing an electrode with an offset tip, said collar comprising:
    a cylindrical base with an upper guide member integrally connected to said cylindrical base, said upper member consisting of a lower cylindrical portion, the diameter of which is smaller than the cylindrical base, and an upper conical portion;
    a vertically extending aperture extending from the bottom of the cylindrical base through the top of the upper member, the center of said aperture being offset from a common center of the cylindrical base and the upper member; and
    means for holding an electrode in the aperture of the collar while it is being dressed.

8. The offset tip collar as defined in claim 7 wherein said vertically extending aperture comprises a first circular aperture vertically extending from the bottom of the cylindrical base through the top of the upper member, and a second circular aperture of a greater diameter than said first aperture, vertically extending from the bottom of the cylindrical base through the top of the upper member, with a center laterally spaced from that of the first aperture such that there is a substantial overlap of the two apertures.

9. The offset tip collar as defined in claim 8 wherein said means for holding the electrode in the aperture in the offset tip collar comprises:
a horizontally extending threaded aperture extending from an outer surface of said cylindrical base to said first circular aperture, and a threaded shaft for threading into said threaded aperture to engage said electrode and hold said electrode tightly in said collar.

10. The offset tip collar as defined in claim 9 wherein said offset tip collar is made of cold-rolled steel.

11. An electrode tip dressing apparatus comprising:
an offset tip collar for retaining an electrode in such a manner as to expose only that area of the elecrode tip which is to be dressed;
means for aligning and engaging a dressing tool to the electrode tip; and
means for rotating the dressing blade at a speed sufficient to uniformly dress the electrode tip in an offset manner.

12. The electrode tip dressing apparatus as defined in claim 11 wherein said offset tip collar comprises a cylindrical base with an upper member integrally connected to said cylindrical base, said upper member consisting of a lower cylindrical portion, the diameter of which is smaller than the cylindrical base, and an upper conical portion, a vertically extending aperture extending from the bottom of the cylindrical base through the top of the upper member, the center of said aperture being offset from a common center of the cylindrical base and the upper member, and means for tightly holding the electrode in the aperture of the collar while it is being dressed.

13. The electrode tip dressing apparatus as defined in claim 12 wherein said aperture comprises a first circular aperture vertically extending from the bottom of the cylindrical base through the top of the upper member, and a second circular aperture, of a greater diameter than said first aperture, vertically extending from the bottom of the cylindrical base through the top of the upper member, with a center laterally spaced from that of the first aperture such that there is a substantial overlap of the two apertures.

14. The electrode tip dressing apparatus as defined in claim 13 wherein the means for aligning and engaging a dressing tool against the electrode tip comprises a chuck for holding said dressing tool and a retaining nut into which said chuck is secured, thus forming a retaining nut-chuck assembly which is fit over the upper member of said collar thus allowing the dressing tool to contact the exposed electrode tip.

15. The electrode tip dressing apparatus as defined in claim 14 wherein said means for rotating the dressing tool comprises a retaining nut-chuck assembly for a rotary tool.

16. The electrode tip dressing apparatus as defined in claim 15 wherein said means for tightly holding the electrode in the aperture in the offset tip collar comprises a horizontally extending threaded aperture extending from an outer surface of said cylindrical base to said vertically extending aperture and a threaded shaft for threading into said threaded aperture so as to engage said electrode and hold said electrode tightly in said collar.

17. The electrode tip dressing apparatus as defined in claim 16 wherein said offset tip collar is made of cold-rolled steel.

* * * * *